United States Patent [19]

Yamada

[11] Patent Number: 4,734,460
[45] Date of Patent: Mar. 29, 1988

[54] FLUORINE-CONTAINING ELASTOMER COMPOSITION

[76] Inventor: Okimasa Yamada, 3-506, Isohara 678, Isohara-machi, Kitaibaraki city, Ibaraki, Japan

[21] Appl. No.: 884,598

[22] Filed: Jul. 11, 1986

[30] Foreign Application Priority Data

Oct. 15, 1985 [JP] Japan .................................. 60-227777

[51] Int. Cl.⁴ ............................................. C08F 8/30
[52] U.S. Cl. ................................... 525/279; 525/326.3
[58] Field of Search ........................................ 525/279

[56] References Cited

FOREIGN PATENT DOCUMENTS 5946986 10/1982 Japan .

*Primary Examiner*—Joseph L. Schofer
*Assistant Examiner*—Bernard Lipman
*Attorney, Agent, or Firm*—Fred Philpitt

[57] ABSTRACT

A fluorine-containing elastomer composition comprising a fluorine-containing elastomer, at least one of oxides and hydroxides of divalent metal, a polyhydroxyaromatic compound, and a quaternary ammonium salt compound represented by the general formula:

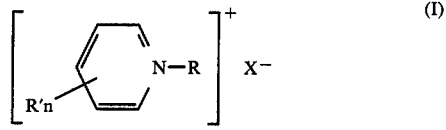

and, if desired, further containing at least one of 1,8-diazabicyclo(5,4,0)-undec-7-en, 1,5-diazabicyclo(4,3,0)-non-5-en and 4-dialkylaminopyridine has good storage stability and vulcanization characteristics as green elastomer composition and gives distinguished physical properties to the vulcanized products.

17 Claims, No Drawings

FLUORINE-CONTAINING ELASTOMER COMPOSITION

BACKGROUND OF THE INVENTION

1. Field of the Invention

This invention relates to a fluorine-containing elastomer composition, and more particularly to a fluorine-containing elastomer composition having excellent stability and vulcanization characteristics as green elastomer composition and giving excellent physical properties to the vulcanized products.

2. Description of the Prior Art

Owing to useful characteristics at elevated temperatures, such as high heat resistance, high chemical resistance, high oil resistance, high weathering resistance, demands for valcanized products of fluorine-containing elastomer have been drastically increasing in the form of sealing materials such as gaskets, O-rings, packings etc., hoses, sheets, etc. in the fields of the automobile industry, the oil hydraulic industry, the general machine industry, the aviation industry, etc. In other words, it can be said that the demands for the vulcanized products of fluorine-containing elastomers have become versatile and stringent in addition to a demand for more efficient molding and processing.

Vulcanization of the fluorine-containing elastomer was initially carried out with polyamine-based derivatives such as bexamethylenediamine carbonate and methylenebis(cyclohexyl)amine carbonate, but these vulcanization systems gave a poor scorching resistance such a poor processing safety and a poor storage stability or the vulcanized products had a poor permanent compression strain. Thereafter, a process for cross-linking the fluorine-containing elastomer with a polyhydroxyaromatic compound in the presence of a vulcanization accelerator and an acid acceptor was proposed as another vulcanization system capable of overcoming the aforementioned disadvantages, and has been practically utilized up to now.

The vulcanization accelerators so far proposed for the vulcanization system are quaternary phosphonium salt compounds (Japanese patent application Kokai (Laid-open) No. 47-191), quaternary ammonium salt compounds (Japanese patent Publication No. 52-38072 and Japanese patent application Kokai (Laid-open) No. 47-3831), quaternary ammonium salt compounds of 8-alkyl (or aralkyl)-1,8-diazabicyclo(5,4,0)-undec-7-en (Japanese patent Publication No. 52-8863 and Japanese patent application Kokai (Laid-open) No. 48-55231), or combinations thereof with such an amount of 1,8-diazabicyclo(5,4,0)-undec-7-en as substantially not to vulcanize the fluorine-containing elastomer (Japanese patent publication No. 57-20333), etc.

However, vulcanized products even from these vulcanization systems had no satisfactory level of permanent compression strain, particularly at an elevated temperature, and also still had a low mechanical strength.

A vulcanization system containing a vulcanization accelerator of the quaternary ammonium salt compound had a considerable susceptibility to moisture absorption and deliquescence at the storage in addition to the aforementioned disadvantages and thus needed a special consideration for the storing. This not only caused a handling trouble, but also often lowered the vulcanization characteristics and the physical properties of vulcanized products.

The present applicant have been so far made extensive studies on acceleration of the vulcanization rate without deteriorating the scorching resistance and the permanent compression strain of vulcanized products and also on solution of the problems appearing in the so far known vulcanization systems, and previously found that in a valcanization system using a polyhydroxyaromatic compound as a cross-linking agent in the presence of an acid acceptor, not only good storage stability, processing safety and vulcanization characteristics (vulcanization flowability, vulcanization rate, etc.) as green elastomer composition, but also considerably improved mechanical strength and permanent compression strain of vulcanized product, which had been the problems to be improved in the so far known vulcanization system, could be obtained by using a specific quaternary ammonium salt compound and an N-alkyl-substituted amide compound as vulcanization accelerator components at the same time, or further using such an amount of 1,8-diazabicyclo(5,4,0)-undec-7-en, 1,5-diazabicyclo(4,3,0)-non-5-en or a 4-dialkylaminopyridine whose an alkyl group has 1 to 4 carbon atoms as to substantially fail to vulcanize the fluorine-containing elastomer together with the said two vulcanization accelerator components, and proposed a vulcanization system based on this finding (Japanese patent publication No. 59-46986). The vulcanization system was found to be effective for improving the dispersibility of the system at the kneading and the shapability at the vulcanization molding.

In the said vulcanization system, a quaternary ammonium salt compound represented by the following general formula (II):

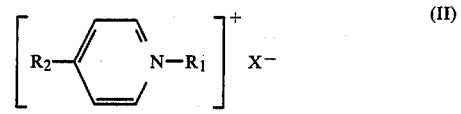

wherein $R_1$ is an aralkyl group having 7 to 20 carbon atoms, $R_2$ is a hydrogen atom or a dialkylamino group whose alkyl group has 1 to 4 carbon atoms, and $X^-$ is an anion, was used as the said specific ammonium salt compound. A fluorine-containing elastomer composition containing the quaternary ammonium salt compound and the N-alkyl-substituted amide compound had no fear at all of moisture absorption and diliquescence during the storage. Furthermore, the said fluorine-containing elastomer composition had good storage stability, processing safety, and vulcanization characteristics, and gave a considerably improved shapability at the vulcanization molding, mechanical strength and permanent compression strain to vulcanized products and also had a higher vulcanization rate without deteriorating the scorching resistance.

As a result of further studies on the said vulcanization system, the present inventor have now found that a vulcanization system showing no moisture absorption or no deliquescence during the storage, and also all the preferable characteristics as in the afore-mentioned vulcanization system can be obtained by introducing at least one hydrocarbon substituent into the 1-aralkyl pyridinium salt represented by the said general formula (II) without using the N-alkyl-substituted amide compound at the same time.

SUMMARY OF THE INVENTION

An object of the present invention is to provide a fluorine-containing elastomer composition showing no moisture absorption or no deliquescence during the storage of green elastomer composition.

Another object of the present invention is to provide a fluorine-containing elastomer composition capable of considerable improving the mechanical strength and permanent compression strain of vulcanized products and accelerating the vulcanization rate without deteriorating the scorching resistance.

Further object of the present invention is to provide a vulcanization system for a fluorine-containing elastomer, based on a quaternary ammonium salt compound without requiring an N-alkyl-substituted amide compound.

There objects can be attained by a fluorine-containing elastomer composition comprising the following components (a) to (d) or (a) to (e). That is, the present fluorine-containing elastomer composition comprises (a) a fluorine-containing elastomer, (b) at least one of an oxide and a hydroxide of divalent metal, (c) a polyhydroxyaromatic compound, and (d) a quaternary ammonium salt compound represented by the following general formula (I):

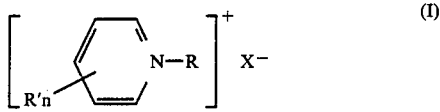

wherein R is an aralkyl group having 7 to 20 carbon atoms, R' is an alkyl group having 1 to 24 carbon atoms, an arkyl group having 6 to 24 carbon atoms, or an aralkyl group having 7 to 20 carbon atoms, $X^-$ is an anion, and n is an integer of 1 to 5, or further (e) such an amount of 1,8-diazabiscyclo(5,4,0)-undec-7-en, 1,5-diazabicyclo(4,3,0)-non-5-en or 4-dialkylaminopyridine whose alkyl group has 1 to 4 carbon atoms as to substantially fail to vulcanize the fluorine-containing elastomer.

DETAILED DESCRIPTION OF THE PREFERRED EMBODIMENTS

Fluorine-containing elastomer to be vulcanized is highly fluorinated copolymers in an elastomeric state, and for example, copolymers of vinylidene fluoride with other fluoroolefins, and more specifically include copolymers of vinylidene fluoride with at least one of hexafluoropropene, pentafluoropropene, trifluoroethylene, trifluorochloroethylene, tetrafluoroethylene, vinyl fluoride, perfluoroacylate ester, perfluoroalkyl acylate, perfluoromethyl vinyl ether, perfluoropropyl vinyl ether, etc., and preferably copolymer of vinylidene fluoride-hexafluoropropene and terpolymer of vinylidene fluoride-tetrafluoroethylene-hexafluoropropene. It is preferable that the copolymer contains about 40 to about 90% by mole of vinylidene fluoride.

As the oxide and the hydroxide as an acid-acceptor in the present invention, generally about 1 to about 40 parts by weight, preferably about 3 to about 15 parts by weight of at least one of oxides and hydroxides of divalent metals such as magnesium, calcium, barium, lead, zinc, etc. is used per 100 parts by weight of the fluorine-containing elastomer in the present invention.

The polyhydroxyaromatic compound for use as a cross-linking agent in the present invention includes 2,2-bis(4-hydroxyphenyl)propane (bisphenol A), 2,2-bis(4-hydroxyphenyl)perfluoropropane (bisphenol AF), hydroquinone, cathecol, resorcinol, 4,4'-dihydroxydiphenyl, 4,4'-dihydroxydiphenylmethane, 4,4'-dihydroxydiphenylsulfone, 2,2-bis(4-hydroxyphenyl)butane, etc., preferably bisphenol A, bisphenol AF, hydroquinone, etc. These may be in the form of an alkali metal salt or alkaline earth metal salt. The cross-linking agent is used in an amount of about 0.5 to about 10 parts by weight, preferably about 0.5 to about 6 parts by weight, per 100 parts by weight of the fluorine-containing elastomer. Below about 0.5 parts by weight, the cross-linking density becomes too small, whereas above about 10 parts by weight the cross-linking density becomes too high, with the result that the rubber-like resilience is lost.

The quaternary ammonium salt compound represented by the said formula (I) includes, for example, 1-benzyl-3,5-dimethylpyridinium chloride, 1-benzyl-4-phenylpyridinium chloride, 1-benzyl-3,5-dimethylpyridinium stearate, 1,4-dibenzylpyridinium chloride, 1-benzyl-4-phenylpyridinium stearate, 1-benzyl-4-ethylpyridinium chloride, 1-benzyl-4-methylpyridinium chloride, 1-benzyl-3-ethyl-4-methylpyridinium chloride, 1-benzyl-4-n-propylpyridinium chloride, 1-benzyl-4-tert-butylpyridinium chloride, 1-benzyl-2,4,6-trimethylpyridinium chloride, etc. Some anions are exemplified above, but the anion includes halide, hydroxylate, alkoxylate, carboxylate, phenoxide, sulfonate, sulfate, sulfite, carbonate, nitrate, etc.

About 0.1 to about 10 parts by weight, preferably about 0.1 to about 2 parts by weight of at least one of the quaternary ammonium salt compounds is used per 100 parts by weight of the fluorine-containing elastomer. Below about 0.1 parts by weight, the cross-linkability will be deteriorated, whereas above 10 parts by weight various characteristics of vulcanized products are adversely influenced to a considerable degree.

At least one of 1,8-diazabicyclo(5,4,0)-undec-7-en and 1,5-diazabicyclo(4,3,0)-non-5-en, if contained as an additional component in the composition, has a remarkable effect or the improvement of permanent compression strain of vulcanized products. Furthermore, a 4-dialkylaminopyridine whose alkyl group has 1 to 4 carbon atoms, such as 4-dimethylaminopyridine, 4-diethylaminopyridine, 4-di(n-butyl)aminopyridine, etc., if further contained as the additional component in the composition, has a remarkable effect on the acceleration of cross-linking reaction and thus can reduce the amount of the quaternary ammonium compound to be contained in the composition. This ultimately leads to an effective improvement of permanent compression strain. At least one of these additional components is contained generally in such an amount as to substantially fail to vulcanize the fluorine-containing elastomer, preferably in an amount of not more than about 0.1 part by weight per 100 parts by weight of the fluorine-containing elastomers, and particularly preferably in a ratio of not more than about 10% by weight thereof to the quaternary ammonium salt compound. Above the upper limit, an adverse effect will appear on the scorching resistance of green elastomer composition, and the cross-linking density of vulcanized product will be too high, resulting in a decrease in elongation.

Furthermore, it is possible to add about 0.1 to about 5 parts by weight, preferably not more than about 3 parts by weight of an N-alkyl-substituted amide compound, for example, an N-alkyl-substituted carboxylic acid amide such as dimethylformanide and dimethylacetamide, an N-alkyl-substituted heterocyclic amide such as N-methylpyrrolidone and an N-alkyl-substituted phosphoric acid amide such as hexamethylphosphoramide to the present composition per 100 parts by weight of the fluorine-containing elastomer. Addition of the N-alkyl-substituted amide compound can further improve the vulcanization characteristics.

These components for the vulcanization system can be mixed together and kneaded as such, or diluted with and dispersed in carbon black, silica powder, clay, talc, diatomaceous earth, barium sulfate, etc. or may be used as a master batch dispersion with the fluorine-containing elastomer. Furthermore, so far known filler, reinforcing agent, plasticizer, lubricant, processing additive, pigment, can be added, if desired, to the present composition besides the foregoing components.

Vulcanization is carried out by heating after the said components for the vulcanization system and the said various additives are added to the fluorine-containing elastomer and mixed according to a conventional mixing method, for example, by roll mixing, kneader mixing, Banbury mixing, solution mixing, etc. Generally, primary vulcanization is carried out by heating at a temperature of about 140° to about 200° C. for about 2 to about 120 minutes, and secondary vulcanization is carried out by heating at about 150° to about 250° C. for up to 30 hours.

The present fluorine-containing elastomer composition shows neither moisture absorption nor deliquescence during the storage of green elastomer composition and not only has good storage stability and processing safety, but also gives distinguished physical properties, particularly high elongation strength to the vulcanized products, and also has a remarkable improvement of permanent compression strain.

The present invention will be described in detail below, referring to Examples and Comparative Examples.

EXAMPLES 1 to 4 and COMPARATIVE EXAMPLES 1 to 3

Copolymer obtained by copolymerization of vinylidene fluoride with hexafluoropropene in the presence of ammonium persulfate as a polymerization initiator in an aqueous medium, using acetone as a chain transfer agent (molar ratio of comonomers = 78 : 22 (vinylidene fluoride: hexafluoropropene), solution viscosity $\eta$ sp/c = 0.98 (35° C. in acetone, c = 1.0), Mooney viscosity of copolymer $ML_{1+10}$ 53 (121° C.); fluorine-containing elastomer (A) was mixed with the components shown in the following Table 1 according to the composition proportions shown therein through 8-inch mixing rolls to prepare fluorine-containing elastomer composition. The composition formulations are given in parts by weight in Table 1.

TABLE 1

| Composition formulation | Example | | | | Comparative Example | | |
|---|---|---|---|---|---|---|---|
| | 1 | 2 | 3 | 4 | 1 | 2 | 3 |
| Fluorine-containing elastomer A | 100 | 100 | 100 | 100 | 100 | 100 | 100 |
| MT carbon black | 25 | 25 | 25 | 25 | 25 | 25 | 25 |
| Calcium hydroxide | 5 | 5 | 5 | 5 | 5 | 5 | 5 |
| Magnesium oxide | 3 | 3 | 3 | 3 | 3 | 3 | 3 |
| Bisphenol AF | 2 | 2 | 2 | 2 | 2.2 | 2 | 1.8 |
| 1,8-diazabicyclo-(5,4,0)-undec-7-en | 0.04 | 0.04 | | 0.04 | 0.03 | | |
| 1-benzyl-3,5-dimethyl-pyridinium chloride | 0.5 | | 0.5 | | | | |
| 1-benzyl-4-phenyl-pyridinium chloride | | 0.5 | | | | | |
| 1,4-dibenzyl-pyridinium chloride | | | | 0.5 | | | |
| 1-benzylpyridinium chloride | | | | | 0.35 | | |
| Benzyltriphenyl-phosphonium chloride | | | | | | 0.5 | |
| 8-benzyl-1,8-diazabi-cyclo(5,4,0)-undec-7-enium chloride | | | | | | | 0.35 |

The thus obtained various fluorine-containing elastomer compositions were subjected to determination of moisture absorption and deliquescence of green elastomer composition (sheets of green elastomer compositions, 100×100×2 mm in size, obtained by adding 100 parts by weight of each of valcanization accelerator component to 100 parts by weight of the fluorine-containing elastomer were placed in a low temperature humidistatic and thermostatic chamber made by Hashimoto Seisakusho K. K., Japan, and the surface state of the sheets was inspected after being left at a temperature of 25° C. and a humidity of 70% for 24 hours, and the non-wet state was evaluated as "none", the wet state as "yes", and the water droplet-deposited state as "considerable"); Mooney viscosity and scorching time (time required until the Mooney viscosity takes a minimum value of +5, serving as an index for the storage stability and the processing safety as measured at the temperature of 121° C.) and vulcanization characteristics by means of an oscillating disk rheometer (ODR) made by Toyo Seiki K. K., Japan.

Furthermore, the elastomer compositions were vulcanized by pressing at 180° C. for 5 minutes and then subjected to secondary vulcanization in an oven at 230° C. for 22 hours, and various physical properties of vulcanized products were determined according to JIS K-6301. Permanent compression strain was measured by making O-rings of P-24 through vulcanization under the same conditions as described above and by 25% compression thereof. The results of the determinations are given in the following Table 2.

TABLE 2

| Determinations | Example 1 | Example 2 | Example 3 | Example 4 | Comparative Example 1 | Comparative Example 2 | Comparative Example 3 |
|---|---|---|---|---|---|---|---|
| Moisture absorption and deliquescence of green elastomer composition | none | none | none | none | considerable | none | considerable |
| Mooney viscosity $ML_{1+4}$ (121° C) (min.) | 72 | 71 | 71 | 72 | 73 | 73 | 74 |
| Scorching time $\Delta 5$ (121° C.)(min.) | 17.1 | 19.5 | 17.8 | 20.6 | 15.2 | 16.8 | 15.1 |
| Physical properties of vulcanized products (vulcanization at 180° C. for 5 min. by pressing and at 230° C. for 22 hours in an oven) | | | | | | | |
| Hardness (JIS A) | 75 | 76 | 75 | 76 | 77 | 77 | 76 |
| 100% modulus (kg/cm$^2$) | 58 | 54 | 56 | 52 | 53 | 54 | 54 |
| Tensile strength (kg/cm$^2$) | 161 | 142 | 158 | 139 | 143 | 120 | 122 |
| Elongation (%) | 245 | 244 | 252 | 248 | 192 | 182 | 183 |
| Permanent compression strain at 200° C. | | | | | | | |
| 22 hours (%) | 10 | 11 | 12 | 11 | 13 | 16 | 19 |
| 70 hours (%) | 17 | 18 | 18 | 18 | 21 | 27 | 35 |

EXAMPLES 5 to 6 and COMPARATIVE EXAMPLE 4

Terpolymer of vinylidene fluoride-tetrafluoroethylene-hexafluoropropene (molar ratio 4 : 41 : 18) (terpolymer Mooney viscosity $ML_{1+10}$ 96 (121° C.); fluorine-containing elastomer B) was mixed with the components as shown in the following Table 3 according to the composition formulation also given in Table 3 through 8-inch mixing rolls to prepare fluorine-containing elastomer compositions.

The thus obtained fluorine-containing elastomer composition were subjected to determinations in the same manner as in Examples 1 to 4, and the results are given in Table 3.

TABLE 3

| | Example 5 | Example 6 | Comp. Ex. 4 |
|---|---|---|---|
| Composition formulation | | | |
| Fluorine-containing elastomer B | 100 | 100 | 100 |
| MT carbon black | 20 | 20 | 20 |
| Calcium hydroxide | 5 | 5 | 5 |
| Magnesium oxide | 3 | 3 | 3 |
| Hydroquinone | 1.2 | 1.2 | 1.2 |
| 1-benzyl-3,5-dimethyl-pyridinium chloride | 0.5 | 0.5 | |
| 1-benzylpyridinium cyloride | | | 0.5 |
| 1,5-diazabicyclo-(4,3,0)-non-5-en | 0.05 | | |
| 4-dimethylaminopyridine | | 0.04 | 0.04 |
| Determination | | | |
| Moisture absorption and deliquescence of green composition elastomer composition | none | none | considerable |
| Physical properties of vulcanized products (vulcanized at 180° C. for 5 min. by pressing and at 230° C. for 22 hours in an oven) | | | |
| Hardness (JIS A) | 74 | 74 | 74 |
| 100% modulus (kg/cm$^2$) | 69 | 65 | 72 |
| Tensile strength (kg/cm$^2$) | 170 | 164 | 153 |
| Elongation (%) | 221 | 219 | 178 |
| Permanent compression strain at 200° C (22 hrs.) (%) | 13 | 16 | 19 |

What is claimed is:

1. A fluorine-containing elastomer composition which comprises:

(a) 100 parts by weight of a fluorine-containing elastomer,
(b) 1 to 40 parts by weight of at least one of oxides and hydroxide of divalent metal, (c) 0.5 to 10 parts by weight of a polyhydroxyaromatic compound, and (d) 0.1 to 10 parts by weight of a quaternary ammonium salt compound represented by the following general formula (I):

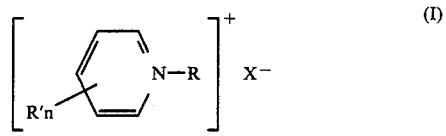

wherein R is an aralkyl group having 7 to 20 carbon atoms, R' is an alkyl group having 1 to 24 carbon atoms, an aryl group having 6 to 24 carbon atoms or an aralkyl group having 7 to 20 carbon atoms, $X^-$ is an anion, and n is an integer of 1 to 5.

2. A fluorine-containing elastomer composition according to claim 1, wherein the fluorine-containing elastomer is a copolymer of vinylidene fluoride with other fluoroolefin.

3. A fluorine-containing elastomer composition according to claim 2, wherein the copolymer of vinylidene fluoride is a copolymer of vinylidene fluoride-hexafluoropropene.

4. A fluorine-containing elastomer composition according to claim 2, wherein the copolymer of vinylidene fluoride is a terpolymer of vinylidene fluoride-tetrafluoroethylene-hexafluoropropene.

5. A fluorine-containing elastomer composition according to claim 1, wherein the polyhydroxyaromatic compound is bisphenol A.

6. A fluorine-containing elastomer composition according to claim 1, wherein the polyhydroxyaromatic compound is bisphenol AF.

7. A fluorine-containing elastomer composition according to claim 1, wherein the polyhydroxyaromatic compound is hydroquinone.

8. A fluorine-containing elastomer composition according to claim 1, wherein the quaternary ammonium salt compound is 1-benzyl-pyridinium salt compound substituted with a R'n group.

9. A fluorine-containing elastomer composition, which comprises (a) 100 parts by weight of a fluorine-containing elastomer, (b) 1 to 40 parts by weight of at least one of oxides and hydroxides of divalent metal, (c) 0.5 to 10 parts by weight of a polyhydroxyaromatic compound, (d) 0.1 to 10 parts by weight of a quaternary ammonium salt compound represented by the general formula (I):

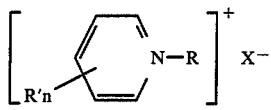
(I)

and (e) at least one of such an amount of 1,8-diazabicyclo (5,4,0)-undec-7-en, 1,5-diazabicyclo(4,3,0)-non-5-en and 4-dialkylaminopyridine whose alkyl group has 1 to 4 carbon atoms as to substantially fail to vulcanize the fluorine-containing elastomer.

10. A fluorine-containing elastomer composition according to claim 9, wherein the fluorine-containing elastomer is a copolymer of vinylidene fluoride with fluoroolefin.

11. A fluorine-containing elastomer composition according to claim 10, wherein the copolymer of vinylidene fluoride is a copolymer of vinylidene fluoride-hexafluoropropene.

12. A fluorine-containing elastomer composition according to claim 10, wherein the copolymer of vinylidene fluoride is a terpolymer of vinylidene fluoride-tetrafluoroethylene-hexafluoropropene.

13. A fluorine-containing elastomer composition according to claim 9, wherein the polyhydroxyaromatic compound is bisphenol A.

14. A fluorine-containing elastomer composition according to claim 9, wherein the polyhydroxyaromatic compound is bisphenol AF.

15. a fluorine-containing elastomer composition according to claim 9, wherein the polyhydroxyaromatic compound is hydroquinone.

16. A fluorine-containing elastomer composition according to claim 9, wherein the quaternary ammoninum salt compound is 1-benzylpyridinium salt compound substituted with a R'n group.

17. A fluorine-containing elastomer composition according to claim 9, wherein the component (e) is used in an amount of not more than 0.1 part by weight per 100 parts by weight of the fluorine-containing elastomer and in a ratio of not more than 10% by weight thereof to the quaternary ammonium salt compound.

* * * * *